US011926399B2

(12) United States Patent
Pedemonte et al.

(10) Patent No.: US 11,926,399 B2
(45) Date of Patent: Mar. 12, 2024

(54) DEVICE FOR DETECTING THE PRESSURE OF COMPRESSED GAS CYLINDERS IN BREATHING APPARATUSES FOR SCUBA DIVING

(71) Applicant: CRESSI-SUB S.p.A., Genoa (IT)

(72) Inventors: Stefano Pedemonte, Genoa (IT); Giuseppe Marenco, Genoa (IT)

(73) Assignee: Cressi-Sub S.P.A., Genoa (IT)

( * ) Notice: Subject to any disclaimer, the term of this patent is extended or adjusted under 35 U.S.C. 154(b) by 713 days.

(21) Appl. No.: 17/052,455

(22) PCT Filed: May 21, 2019

(86) PCT No.: PCT/IB2019/054171
§ 371 (c)(1),
(2) Date: Nov. 2, 2020

(87) PCT Pub. No.: WO2019/224703
PCT Pub. Date: Nov. 28, 2019

(65) Prior Publication Data
US 2021/0171169 A1 Jun. 10, 2021

(30) Foreign Application Priority Data
May 25, 2018 (IT) .................. 102018000005711

(51) Int. Cl.
*B63C 11/26* (2006.01)
*B63C 11/18* (2006.01)
(Continued)

(52) U.S. Cl.
CPC .............. *B63C 11/26* (2013.01); *B63C 11/18* (2013.01); *G01L 19/12* (2013.01); *B63C 2011/021* (2013.01)

(58) Field of Classification Search
CPC ... B63C 11/26; B63C 11/18; B63C 2011/021; B63C 11/02; G01L 19/12; A62B 9/006
See application file for complete search history.

(56) References Cited

U.S. PATENT DOCUMENTS 4,586,136 A * 4/1986 Lewis .................... B63C 11/32
                                                           702/140
4,882,678 A   11/1989 Hollis et al.
(Continued)

FOREIGN PATENT DOCUMENTS

DE  202011101153 U1  7/2011
EP      0428131 A2  5/1991

OTHER PUBLICATIONS

Patent Cooperation Treaty, International Search Report and Written Opinion for International Application No. PCT/IB2019/054171, 8 pages, dated Mar. 7, 2019.

*Primary Examiner* — Xin Y Zhong
(74) *Attorney, Agent, or Firm* — Blank Rome LLP

(57) ABSTRACT

The present invention refers to a device for detecting the pressure of compressed gas cylinders in breathing apparatuses for scuba diving which can be powered by means of a battery, provided with a pressure sensor. The device allows the housing of sensors with sufficiently large dimensions, guaranteeing precise gas cylinder pressure readings. Furthermore, the elements that guarantee the watertight seal of the device can be replaced in a practical effective manner.

8 Claims, 3 Drawing Sheets

(51) Int. Cl.
*G01L 19/12* (2006.01)
*B63C 11/02* (2006.01)

(56) References Cited

U.S. PATENT DOCUMENTS 5,315,877 A * 5/1994 Park ...................... G01L 19/069
73/718
2014/0048069 A1 * 2/2014 Fattah ..................... B63C 11/26
128/204.21

* cited by examiner

DEVICE FOR DETECTING THE PRESSURE OF COMPRESSED GAS CYLINDERS IN BREATHING APPARATUSES FOR SCUBA DIVING

CROSS-REFERENCE TO RELATED APPLICATIONS

This application claims priority to PCT International Application No. PCT/IB2019/054171 filed on May 21, 2019, which application claims priority to Italian Patent Application No. 102018000005711 filed on May 25, 2018, the disclosures of which are expressly incorporated herein by reference.

STATEMENT RE: FEDERALLY SPONSORED RESEARCH/DEVELOPMENT

Not applicable.

DESCRIPTION

Field of the invention

The present invention refers to the sector of instruments for underwater use; in particular, the present invention refers to a device for detecting the pressure of compressed gas cylinders in breathing apparatuses for scuba diving.

State of the Art

The devices currently on the market for detecting the pressure of compressed gas cylinders for scuba diving are subject to compromises in terms of both maintenance and size.

To obtain dimensionally acceptable products, small sensors are required which are less precise and/or more expensive than larger sensors; alternatively, in order to use larger sized sensors, housings are required for the sensors, but this makes product maintenance difficult.

The technical problem encountered therefore pertains to the use of sensors with a relatively large diameter to obtain more precise cylinder pressure readings, without this affecting housing and maintenance.

The Applicant of the present patent application has ascertained the need to produce an efficient device for detecting the pressure of gas cylinders for underwater use.

SUMMARY OF INVENTION

In a first aspect, the present invention refers to a detection device for detecting the pressure of compressed gas cylinders in breathing apparatuses for scuba diving, like the one indicated in claim 1.

The present invention stems from the general consideration that the technical problem highlighted above can be effectively and reliably solved by means of a watertight device for underwater use that comprises:
- a main body internally comprising a housing to house at least one pressure sensor for detecting the pressure of a gas cylinder connected to said device;
- an interface element that connects said pressure sensor to a hose for connection to said cylinder;
- at least one seal element arranged between said interface element and said pressure sensor, wherein said interface element is removably fixed to said main body by means of at least one fixing element which is arranged at the housing that houses said pressure sensor.

In this way, due to the configuration of the device for underwater use of the present invention, it is possible to use pressure sensors having a large diameter, high precision and low cost in a device with extremely compact external dimensions, maintaining the characteristics of easy maintenance.

Furthermore, the watertight elements can be fully replaced from outside of the device without affecting the seals of the rest of the device.

In fact, it is sufficient to remove the fixing element that fixes the interface element to the main body of the device of the present invention to access the seal elements to be replaced located between the interface element and the pressure sensor.

In a preferred embodiment, said housing for the pressure sensor is substantially cylindrical-shaped, hollow inside, and is provided with a substantially circular shaped lateral opening facing said interface.

According to a preferred embodiment, said pressure sensor is substantially cylindrical-shaped with the diameter of the base surfaces slightly smaller than the diameter of said lateral opening of the housing so that the pressure sensor can be inserted, through said lateral opening, to fit tightly inside the housing, following the circular contours thereof.

In this way, the space inside the housing is practically completely occupied by the pressure sensor, which can therefore be chosen with dimensions such as to adapt to the large space available in said housing.

According to a preferred embodiment, said at least one fixing element is removably fixed to said housing perpendicular to the axis of the pressure sensor.

According to a preferred embodiment, a first and a second fixing element are present arranged diametrically opposite relative to the circular surface of said pressure sensor housing, each of said first and second fixing elements being arranged perpendicular to the axis of the pressure sensor.

This improves fixing of the interface element to the main body of the device of the present invention.

According to a preferred embodiment, the device of the present invention further comprises a compartment for at least one battery to power said device.

According to a preferred embodiment, the device of the present invention further comprises a closing element for closing said battery compartment.

In this way, the battery that powers the device is in a protected watertight compartment.

According to a preferred embodiment, the device of the present invention further comprises a central unit able to receive the pressure values detected by said pressure sensor.

According to a preferred embodiment, said central unit is arranged inside said main body.

According to a preferred embodiment, the device of the present invention further comprises a display to make the information detected by said pressure sensor, relative to the pressure of the gas cylinder connected to the device, visible to the user.

BRIEF DESCRIPTION OF THE FIGURES

Further characteristics and advantages of the present invention will become clearer from the examination of the following detailed description of a preferred but not exclusive embodiment, illustrated by non-limiting indicative purposes, with the support of the attached drawings, in which.

DETAILED DISCLOSURE

Figure 1:
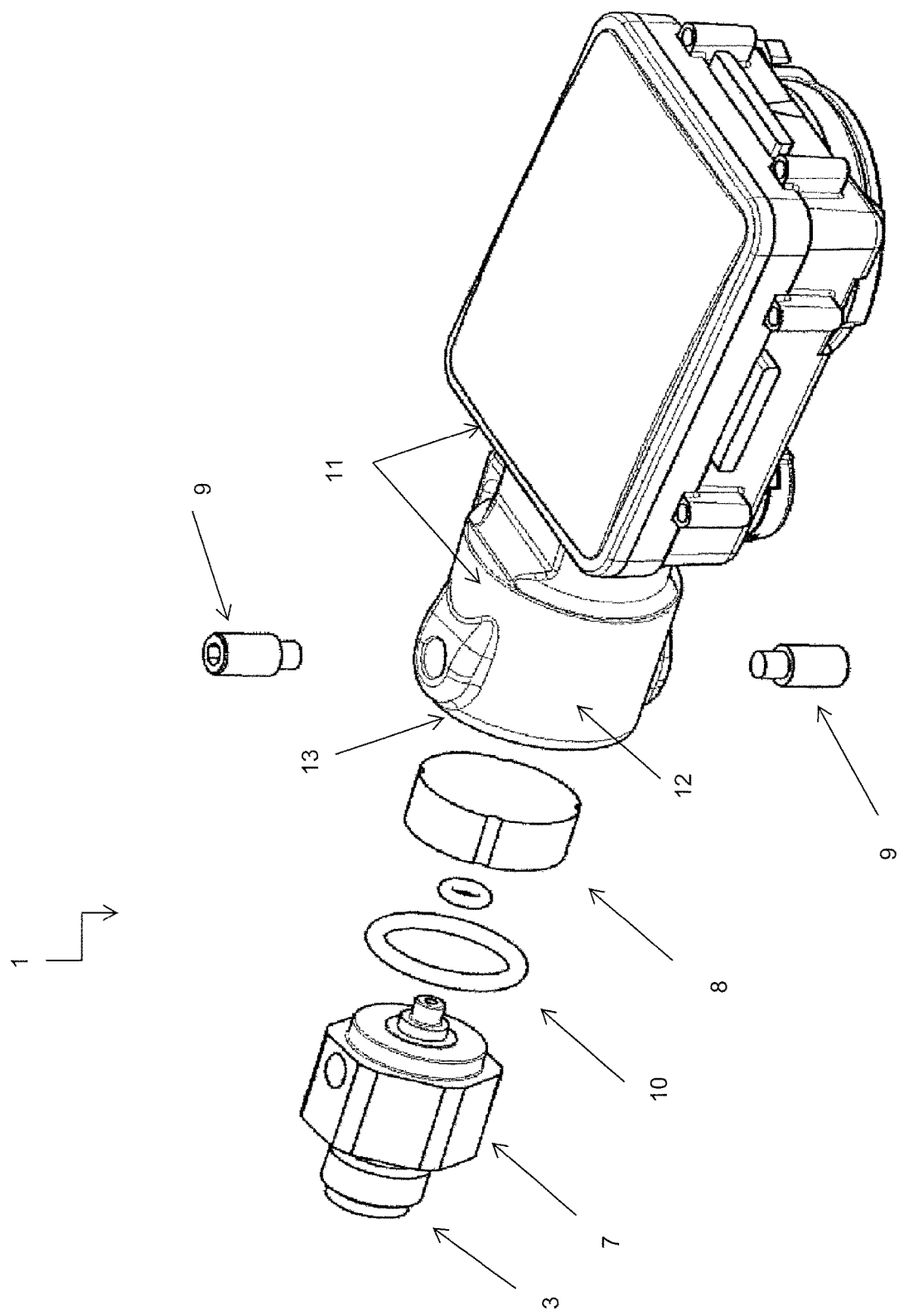
FIG. 1 is an exploded isometric view of an embodiment of the device of the present invention.
Figure 2:
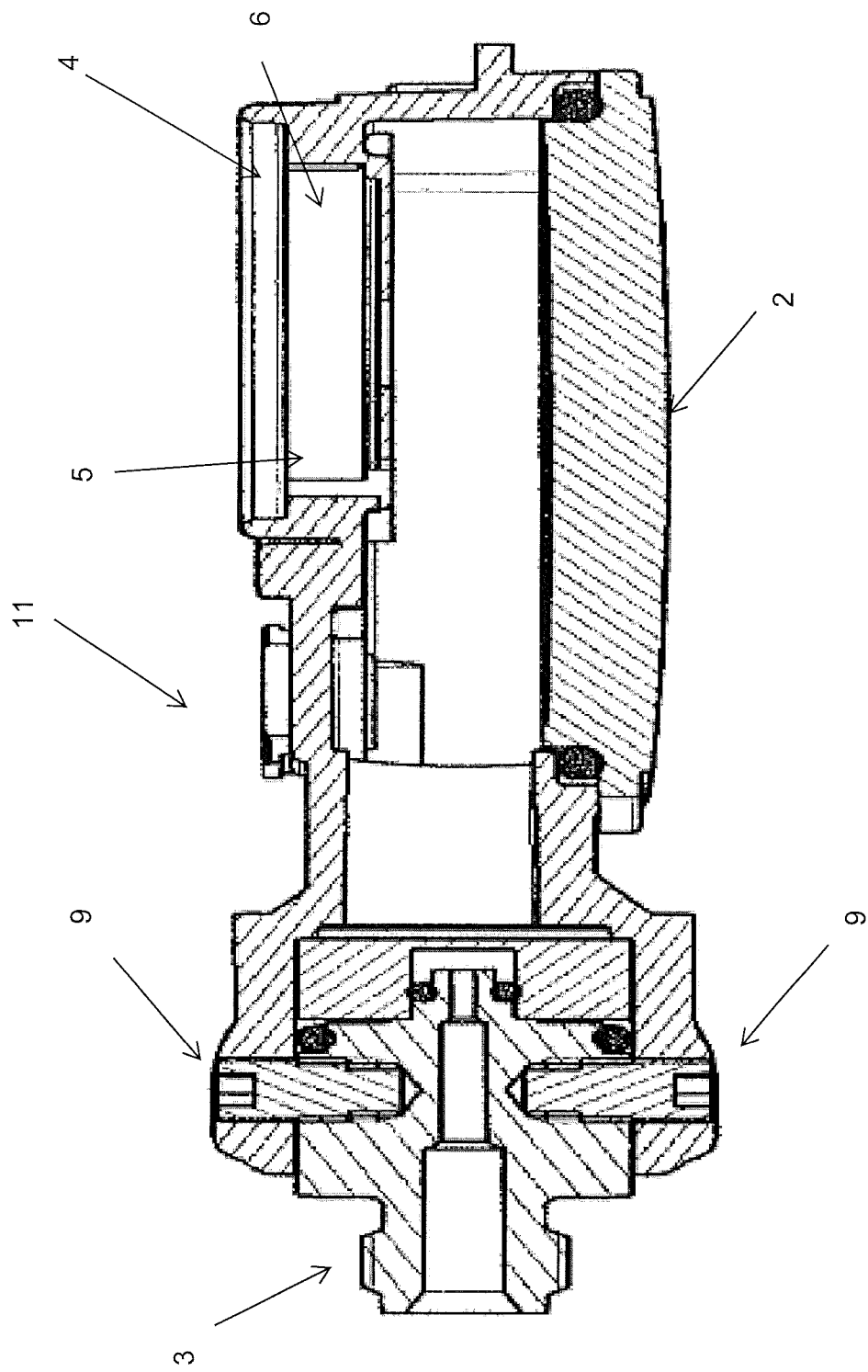
FIG. 2 is a sectional view of the device of FIG. 1.
Figure 3:
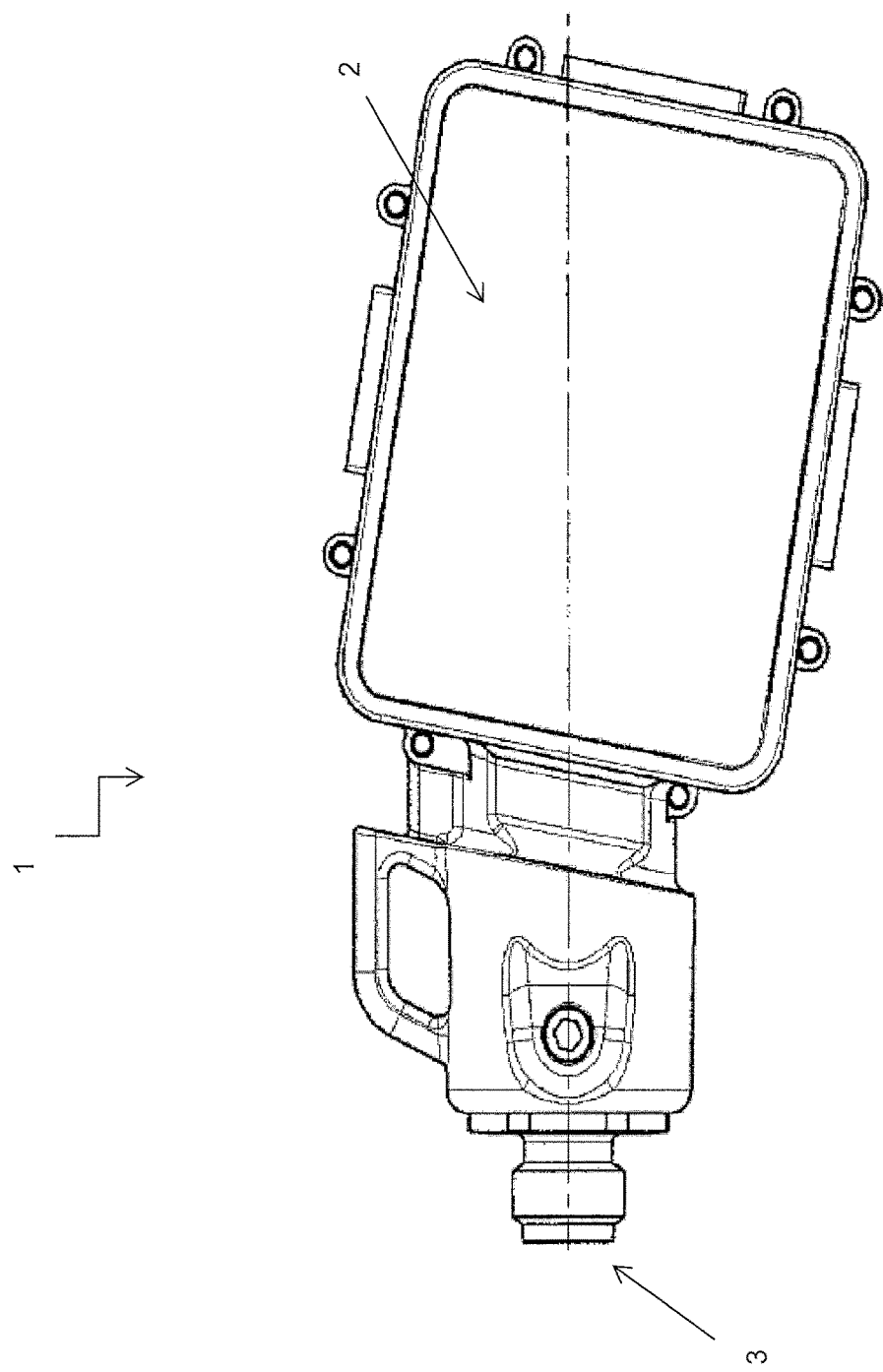
FIG. 3 is a lateral view of the device of FIG. 1.

The following detailed disclosure refers to a particular embodiment shown in FIGS. 1-3.

With reference to FIGS. 1-3 in particular, a watertight device 1 for underwater use provided with a main body 11 is described. The device 1 is powered in a stable manner by a battery 6, housed in a compartment 5 inside the main body 11, the compartment 5 being closed by a plug 4.

The main body 11 internally comprises a cylindrical-shaped housing 12, hollow inside, which has a circular-shaped lateral opening 13. The housing 12 has dimensions such as to be able to internally house a cylindrical-shaped piezoelectric pressure sensor 8, wherein the diameter of its base surfaces is slightly smaller than the diameter of the lateral opening 13 of the housing 12. Said dimensions allow the pressure sensor 8 to be passed through the lateral opening 13 and to be inserted to fit tightly in the housing 12, following the circular contours thereof, thus optimizing the space available for the sensor 8.

The pressure sensor 8 is able to detect the pressure of a gas cylinder for underwater use positioned on the outside of the device 1 of the present invention (not shown in the figures) to which the pressure sensor 8 is connected by means of an interface element 7 located in an intermediate position between the sensor 8 and a hose 3 for connection to the cylinder. Between the sensor 8 and the interface element 7, gasket elements 10 are also provided which ensure that the sensor 8 is watertight.

The interface element 7 is removably fixed to the main body 11 of the device 1 of the present invention by means of two fixing elements 9 arranged at the housing 12 which houses the sensor 8. The two fixing elements 9 are arranged diametrically opposite relative to the circular surface of the opening 13 of the housing 12 of the pressure sensor 8, each of them being arranged perpendicular to the axis of the pressure sensor 8.

The pressure sensor 8 is able to transmit the detected gas cylinder pressure values to a central unit arranged inside the main body 11. Said values detected by the sensor are then displayed to the user via the display 2 positioned on the outside of the main body 11, activated by the central unit.

The device of the present invention therefore allows optimization of the space dedicated to the pressure sensor 8 housed inside the housing 12; the sensor 8 can therefore have sufficiently large dimensions, thus guaranteeing more precise gas cylinder pressure readings.

Furthermore, due to the arrangement of the fixing elements 9 which fix the interface element 7 to the main body 11 of the device 1, it is possible to carry out replacement, in a practical effective manner, of the elements 10 which guarantee the watertight seal of the device. In fact, it is possible to simply remove only the fixing elements 9, leaving unchanged and watertight the remaining portion of the main body 11 of the device 1 housing the other functional elements of the device 1, for example the central unit, the battery 6, etc.

Naturally, many modifications and variations of the preferred embodiments described will be evident to persons skilled in the art while remaining within the scope of the invention.

Therefore, the present invention is not limited to the preferred embodiment described, illustrated only as a non-limiting example, but is defined by the following claims.

The invention claimed is:

1. A device for detecting a pressure of compressed gas cylinders in breathing apparatuses for scuba diving, the device comprising:
    a main body internally comprising a housing to house at least one pressure sensor to detect a pressure of a compressed gas cylinder connected to said device;
    an interface element which connects said pressure sensor to a hose for connection to said compressed gas cylinder;
    at least one seal element arranged between said interface element and said at least one pressure sensor;
    wherein said interface element is removably fixed to said main body by at least one fixing element which is arranged at the housing which houses said at least one pressure sensor;
    wherein said housing which houses said at least one pressure sensor is substantially cylindrically-shaped, is hollow inside, and is provided with a substantially circularly-shaped lateral opening facing said interface element;
    wherein said at least one pressure sensor is substantially cylindrically-shaped, having a base surface diameter smaller than a diameter of said lateral opening of the housing, so that the at least one pressure sensor can be inserted, through said lateral opening, to fit tightly inside the housing, following circular contours of the housing; and
    wherein an external diameter of said interface element is almost equal to an external diameter of said pressure sensor.

2. The device according to claim 1 wherein said at least one fixing element is removably fixed to said housing perpendicular to a longitudinal axis of the at least one pressure sensor.

3. The device according to claim 1 wherein a first and a second fixing element are present, arranged diametrically opposite relative to the cylindrically-shaped housing, of the pressure sensor, each of said first and second fixing elements being arranged perpendicular to a longitudinal axis of the at least one pressure sensor.

4. The device according to claim 3 which further comprises a compartment for at least one battery to power said device.

5. The device according to claim 4 which further comprises a closing element for closing said compartment for the at least one battery.

6. The device according to claim 5 which further comprises a central unit configured to receive pressure values detected by said at least one pressure sensor.

7. The device according to claim 6 wherein said central unit is arranged inside said main body.

8. The device according to claim 7 which further comprises a display to make information detected by said at least one pressure sensor, relative to a pressure of a gas cylinder connected to the device, visible to a user.

* * * * *